United States Patent [19]

Mäder

[11] 4,200,700

[45] Apr. 29, 1980

[54] METHOD OF AFTER-FOAMING A MIXTURE OF A FOAM AND A RESIN SOLUTION

[75] Inventor: Karl Mäder, Rapperswil, Switzerland

[73] Assignee: IDC Chemie AG, Rapperswil, Switzerland

[21] Appl. No.: 905,541

[22] Filed: May 12, 1978

[30] Foreign Application Priority Data

May 13, 1977 [CH] Switzerland ..................... 6035/77

[51] Int. Cl.$^2$ .............................................. C08J 9/30
[52] U.S. Cl. .................................. 521/186; 521/187; 521/905; 521/917
[58] Field of Search ................ 521/186, 187, 905, 917

[56] References Cited

U.S. PATENT DOCUMENTS

| | | | |
|---|---|---|---|
| 2,813,780 | 11/1957 | Vieli | 521/187 |
| 3,486,862 | 12/1969 | Unterstenhoefer | 521/187 |
| 4,038,037 | 7/1977 | Wilmsen | 521/187 |
| 4,132,838 | 1/1979 | Kreuer | 521/917 |

*Primary Examiner*—Edward M. Woodberry

[57] ABSTRACT

A method of after-foaming a mixture containing a foam and a resin solution. The foam component is brought into contact with the resin solution by means of a suction action. The after-foaming is produced due to said suction action and by superfluous air present.

8 Claims, No Drawings

METHOD OF AFTER-FOAMING A MIXTURE OF A FOAM AND A RESIN SOLUTION

BACKGROUND OF THE INVENTION

1. Field of the Invention

The present invention relates to a method of after-foaming a mixture containing a foam and a resin solution.

2. Description of the Prior Art

According to all hitherto known methods for producing a foamed, hardenable material a frothing agent including the hardener agent contained therein has been foamed by means of a gas and thereafter a resin solution was fed into the foam produced thereby, which resin solution was injected by the agency of nozzles. Thereby it was not possible to prevent that the tenside foam which has been foamed up to a volume in a range of 60–70 times the original volume was upon the addition of the resin reduced to a volume of 25–30 times of the original volume due to a defoaming caused by the destruction of the foam cells by the addition of the resin.

SUMMARY OF THE INVENTION

Hence, it is a general object of the present invention to provide an improved method to reduce or eliminate, respectively, the above mentioned defoaming arising by the production of a mixture destined for the production of a foamed material.

Now in order to implement this and still further objects of the invention, which will become more readily apparent as the description proceeds, the method of this development is manifested by the features that the foam component is brought into contact with the resin component by means of a suction action, whereby an after-foaming is produced by means of the vacuum produced by said suction action and by superfluous gas present.

DETAILED DESCRIPTION OF THE PREFERRED EMBODIMENT

The present invention will be more fully understood by reference to the following detailed description thereof.

A resin milk is flowed through the inner of two concentrically arranged pipes, which resin milk features a pressure of about 6 bar (85.2 psia) and a tenside foam is flowed through the outer of the two pipes, which tenside foam was produced in a known manner by means of pressurized air and contains additionally a hardener agent. At the end of the inner pipe opening into the mixing chamber of resin milk and foam (containing the hardener agent) the flow of the resin milk or resin solution forms a flowing layer or flowing curtain, respectively, which features the shape of the cone-shaped shell and which extends from the end of the pipe outwards to the wall of the mixing chamber or the discharge-pipe, respectively. Upon impingement of the thin flowing curtain on the wall the flowing mass is reflected and provides therewith the necessary vacuum or subpressure because the entire flow is directed forwards, and achieves therewith a good mixing and acceleration of the foam. The tenside foam produced by the agency of pressurized air flows in the outer pipe with an extremely low speed or velocity of flow towards the resin curtain and is aspirated into said resin milk due to said vacuum at said resin curtain, whereby thereupon the excellent state of mixture, the additional superfluous air originating from the addition of the foam and the vacuum of the flow produces the after-foaming of the mixture necessary for the production of the foamed material or article.

Preferably aqueous solutions of condensation products of urea and formalin are utilized for producing the resin milk or resin solution, respectively. The water contained in the resin milk is thereby utilized also for aiding in the production and forming of the foam cells during the after-foaming. The weight of the freshly produced foam is thereby smaller than such produced with any known method because during the curing and drying less water has to evaporate out of the foam. Thereby there is obtained an improvement regarding the shrinkage, the separation of formalin etc.

The vacuum produced by the resin curtain flowing through the apparatus, i.e. produced by its flow can be of a low value and if necessary can be generated by means of a pump.

The covering of the mixing chamber by means of a flowing layer can be carried out in an optional manner, whereby the thickness of the curtain is variable.

EXAMPLE 1

The water soluble condensation product of urea and formalin having a pressure of 6 bar (85.2 psia) was continuously fed through a pipe such that a continuous cone-shaped curtain in the mixing chamber was produced. In a concentrically arranged outer pipe a likewise continuous changing of the foam produced by means of pressurized air was carried out, the foam including phosphoric acid as hardener agent, whereby the tensid was formed by an anion-active Naphtalensulfonate. The volume of the foam was about 60–70 times larger than the volume of the added 2% tensid solution.

The foam, the hardener agent and the superfluous air were sucked in the resin milk due to the subpressure of the flow of the resin milk at the wall of the mixing chamber, were mixed and after-foamed. The mixture produced thereby was thus ready for the production of a corresponding urea-formaldehyde-foamed material.

While there is shown a present preferred embodiment of the invention, it is to be distinctly understood that the invention is not limited thereto, but may be otherwise variously embodied and practiced within the scope of the following claims.

Accordingly, what is claimed is:

1. A method of after-foaming a mixture containing a foam and a urea-formaldehyde resin solution, wherein the foam component is brought into contact with the resin component by means of a suction action, comprising directing said resin solution to a mixing chamber through an inner pipe and simultaneously directing a foam to said chamber through a concentric space defined by an outer pipe and said inner pipe, whereby an after-foaming is produced by means of the vacuum produced by said suction action and by superfluous gas present.

2. The method as defined in claim 1, wherein the foam component contains a hardener agent necessary for the polymerization of said resin.

3. The method as defined in claim 1, wherein the base materials as well as the produced mixture are guided continuously in form of a pipe flow.

4. The method as defined in claim 3, wherein said resin component is guided in such a flow that said foam component is aspirated.

5. The method as defined in claim 4, wherein a flowing layer is produced by means of said resin component, which layer extends across the complete cross-section of said flow and produces said vacuum necessary for said aspiration of said foam component.

6. The method as defined in claim 5, whereby said resin component is fed in by means of an inner pipe and said foam solution is fed in by means of an outer pipe, whereafter a flowing layer in the shape of a cone if produced with said resin component, the apex of which is arranged at the end of said pipe for infeed of said resin component and the surface of which extends across the complete cross-sectional area of the pipe flow of the mixture produced.

7. The method as defined in claim 1, wherein said superfluous gas present at said after-foaming is superfluous air being aspirated together with said foam component.

8. The method as defined in claim 1, wherein said resin component is a water-soluble urea-formaldehyde resin.

* * * * *